United States Patent [19]

Berthoux et al.

[11] 4,078,246
[45] Mar. 7, 1978

[54] HOLDER FOR MAGNETIC DISCS

[75] Inventors: Jean Louis Berthoux, Paris; Albert Langrenne, La Courneuve, both of France

[73] Assignee: Compagnie Internationale pour l'Informatique Cii-Honeywell Bull (Societe Anonyme), Paris, France

[21] Appl. No.: 755,793

[22] Filed: Dec. 30, 1976

[30] Foreign Application Priority Data

Dec. 31, 1975 France .............................. 75 40359

[51] Int. Cl.$^2$ ......................... G11B 23/04; G11B 25/04
[52] U.S. Cl. .................................... 360/133; 206/444; 346/137
[58] Field of Search ............. 360/133, 135, 86, 97–99, 360/132; 206/444; 346/137

[56] References Cited

U.S. PATENT DOCUMENTS

| | | | |
|---|---|---|---|
| 3,715,739 | 2/1973 | Van Acker | 360/133 |
| 3,981,025 | 9/1976 | Schoettle et al. | 360/133 |

*Primary Examiner*—Alfred H. Eddleman
*Attorney, Agent, or Firm*—Lowe, King, Price & Markva

[57] ABSTRACT

A container for a magnetic data recording disc includes a flat cassette shaped for insertion into a receptacle of disc memory of a data processing apparatus. A normally closed opening in a sidewall of the cassette provides access to the disc for recording and/or reading heads of the data processing apparatus. The cassette includes a pair of generally parallel walls that extend in a direction generally parallel to faces of the disc. One of the opposing walls includes an opening for enabling rotary drive means of the apparatus to be coupled to an annular hub of the disc. The opposed walls are rigid, but elastically deformable. In a free state, the opposed walls are outwardly convex. An internal projection extends from the center of the other opposed wall. The projection has an annular bearing surface facing the inside face of the other wall. The one opposing wall has an opening coaxial with the projection. The opening is surrounded by an annular bearing surface on the outside face of the one wall. The disc includes an annular hub carrying two axially displaced flanges. The flanges respectively extend internally and externally of the hub and are arranged to engage the bearing surfaces of the projection and the other wall. The flanges are axially spaced from each other by a smaller distance than the bearing surfaces in the free state of the cassette opposing walls. Thereby, when the disc is not engaged by the drive means of the apparatus, an elastic restoring force from the opposed walls, while they are in a flattened state, mechanically holds the disc in position. The disc is released from the bearing surfaces in response to the opposed walls being moved closer together by a pressure member and stops of the apparatus.

11 Claims, 3 Drawing Figures

OUT OF USE

IN USE

HOLDER FOR MAGNETIC DISCS

FIELD OF THE INVENTION

The present invention relates to containers for magnetic disc memories of automatic data processing apparatus and more particularly to a disc cassette having elastically deformable, opposed walls.

BACKGROUND OF THE INVENTION

In a conventional arrangement, a plurality of magnetic discs of the type included in data processing memories are coaxially stacked on the same shaft to form a high-capacity memory unit which functions by means of a "comb." Each tooth of the comb carries at least one read/write head under which one face of one of the discs revolves. Radial movement of the read/write heads provides direct access to all the concentric recording tracks in one stack of discs. In this way, it is possible simultaneously to read or write a total number of bits which is twice the number of discs in the stack. Consequently, this arrangement is widely used in systems requiring a large processing capacity.

The contents of such a memory unit can only be altered by erasing the recorded data and then recording fresh data at the same point. This does not present any appreciable problem in large systems equipped with auxiliary memories, such as tape memories. However, in systems of smaller size which perform various data-processing operations selectively but repeatedly, for example to control a machine tool or to perform/accounting operations, it is desirable to alter the contents of a disc memory without losing data. For this purpose it is known to use magnetic discs provided with individual cassettes, the shape and size of which are standardized to enable the cassettes to be interchanged. Cassettes of this kind previously proposed have numerous drawbacks. In particular, (1) complicated operations are required to make them operable, (2) they do not provide complete protection for the disc when not in use, that is to say between two periods of operation, and (3) they hamper cooling and proper cleaning.

Consequently, an object of the invention is to provide an improved magnetic disc cassette which is of a suitable nature to remove the disadvantages mentioned of known designs.

BRIEF DESCRIPTION OF THE INVENTION

The invention relates to improved, flat cassettes for rigid magnetic discs of small diameter, wherein the cassette is shaped to be inserted in a suitable receptacle of a data-processing apparatus. The cassette is provided with normally closed openings which (1) provide access to the internal disc for recording and/or reading means and (2) allow rotary drive means to be coupled to a hub of the disc.

The cassette according to the invention is chiefly characterized in that its opposing walls are rigid, but elastically deformable and are outwardly convex in a free state, i.e., when no forces, except gravity, are applied to the walls of the cassette. At the center of one of the walls, there is provided an internal projection having an annular bearing surface facing the inside face of the one wall. The other wall has an opening coaxial with the projection. The opening is surrounded by an annular bearing surface on the outside face of the other wall. The hub of the disc is annular and carries internal and external flanges which engage respective ones of the said bearing surfaces. The axial spacing between the flanges is less than the bearing surfaces when the cassette walls are in the free state, whereby when the disc is not in use, the elastic restorative force from the flattened walls of the cassette mechanically holds the disc in position. The disc is released when it is in use simply by moving the elastic walls closer together.

Advantageously, the aforementioned bearing surfaces and flanges are also arranged to seal the hub of the disc and the aforesaid opening and thus to close the cassette in a sealed fashion.

In addition, by selecting suitable relative positions and suitable respective diameters for the flanges, the disc can be made self-ventilating in operation as a result of a differential centrifugal effect on its two faces, which assists in cleaning and cooling it.

Other features and advantages of the invention will be better apparent from perusal of the following description of a non-limiting embodiment, which is illustrated by the accompanying drawings.

DETAILED DESCRIPTION OF THE DRAWING

Figure 1:
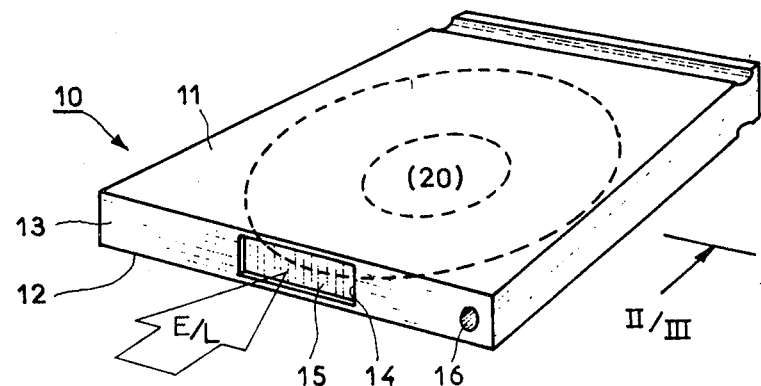
FIG. 1 is an external perspective view of a cassette according to the invention.

Reference is now made to FIG. 1 wherein cassette 10 is illustrated as a flat box of sqare outline, in which is enclosed a magnetic disc 20 having a diameter smaller than that of conventional discs used in stacks.

To make cassette 10 compatible with existing data-processing apparatus, the overall dimensions of the cassette are standardized; for example, its opposing, generally parallel walls 11, 12, have a length which also extends generally parallel to the faces of disc 20, of 270 mm (10.63 inches) and its sidewall 13, a height of 20 mm (0.78 inches). To enabie data reading and/or writing heads E/L to project inwardly of cassette 10 and in close proximity to both of the opposed faces of disc 20, one sidewall 13 of cassette 10 contains a centrally located aperture 14, the center of which is aligned with the plane of disc 20; aperture 14 is normally blocked by shutter 15 in sidewall 13. Shutter 15 is opened by a tamperproof internal mechanism which is operated by inserting a suitable actuator into an aperture 16. Finally, to make cassette 15 easier to handle, a grip P is formed by providing the top and bottom faces 11 and 12 of the cassette with longitudinal grooves running parallel to sidewall 13 and on edges of the faces opposite from face 13.

Cartridge 10 is produced by assembling a plurality of parts made of a rigid, but elastically deformable material; for example, the parts may be assembled by compression molding two complementary shells which are joined around their peripheries after disc 20 has been placed in position. It is, however, understood that the choice of the material, the method of using it, and the manner of assembly and the internal arrangement of the cassette may be dictated by considerations having no bearing on the subject of the invention proper. However, it is necessary for opposing walls 11 and 12 to be elastic, for sidewall 13 to be rigid, and there must be a sealed joint between sidewall 13 and opposing walls 11 and 12. In addition, the various geometric arrangements which are about to be described with reference to FIGS. 2 and 3 should be observed.

Figure 2:
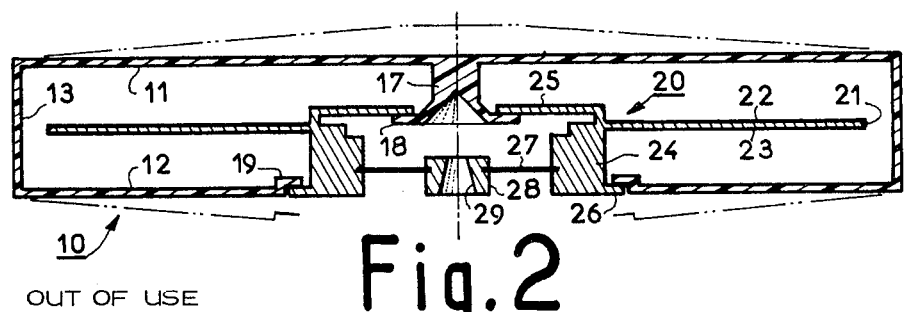
FIGS. 2 and 3 are cross-sections taken on line II—III of FIG. 1 and are schematic views of the cassette out of and in use, respectively.

FIG. 2 is a cross-section of the cassette 10 when out of use, i.e., as it appears during the periods when magnetic disc 20 is between two successive periods of use. When disc 20 is not in use, an external flange 18 termed an "extractor ring," forms an annular bearing surface facing the inside surface of wall 11. Flange 18 is at the end of an internal downward projection 17 in the center of upper wall 11 of cassette 10. Coaxial with projection 17, an opening is provided on the opposite wall 12. The opening is surrounded on the outside face of wall 12 by an annular bearing surface 19. To simplify the drawing, the opposite walls 11 and 12 and sidewall 13, as well as the projection 17 and flange 18, are shown as molded all in one piece from plastic material; it is to be understood that in practice cassette 10 would be produced by assembling a plurality of parts, even if only to enable magnetic disc 20 to be placed in position.

Disc 20 is, in essence, a flat annular main body 21, having opposed flat faces 22, 23 covered with a magnetic coating forming a recording medium, and an annular hub 24. Axially opposed ends of hub 24 respectively carry an internal flange 25 that extends radially inward to engage at its periphery the upper bearing surface of flange 18, and an external flange 26 that extends radially outward to engage bearing surface 19 surrounding the opening in wall 12. In an axial passage through the hub 24 is fitted a diaphragm 27, that is either star-shaped or pierced with holes, and which carries a centering ring 28 containing a tapered hole 29.

The axial distance between the contact faces of flanges 25, 26 with the upper and lower faces of flanges 25 and 26, on the one hand, the weight of projection 17, and the height of the step defining bearing surface 19 on the other, is such that opposing walls 11 and 12 of cassette 10 are maintained substantially flat and parallel as shown in solid lines. However, because of the elastic nature of walls 11 and 12, they tend, in the free state, to assume an outwardly convex shape shown in dotted lines.

It follows that the axial elastic restorative force exerted by walls 11 and 12, when they are flattened to the solid line position, ensures that disc 20, when not in use, is held properly in position in cassette 10 and provides seals at the points where flanges 25 and 26 and bearing surfaces 18 and 19 meet; thus disc 20 is properly protected during periods when it is not being used.

Figure 3:
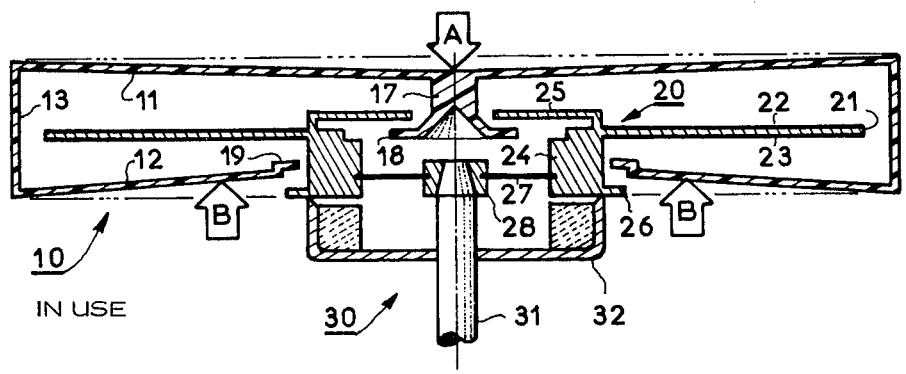

In FIG. 3, disc 20 is illustrated as being released from the upper surface of flange 18 while inside cassette 10 and in active use. In a receptacle of a data processing disc read/write apparatus intended to receive cartridge 10 are arranged active and/or passive means, such as a pressure member A and ramps or stops B which come into action at the time the cartridge is inserted into the receptacle. Pressure member A and stops B move walls 11 and 12 toward each other, as the solid and dotted line outlines show for purposes of comparison. Consequently, flanges 25, 26 on the hub of disc 20 are disengaged from bearing surfaces 18, 19 of cassette 10 to enable the disc to be either rotated or to be cleaned and ventilated.

The drive to rotate disc 20 is provided in a known way by coupling hub 24 of the disc to a drive assembly 30 comprising a taper-headed shaft 31 which fits into centering ring 28, and a collar 32 which engages flange 26 or the appropriate end of the hub. Collar 32 is perforated and provided with coupling means, which may employ magnetic attraction for example.

Ventilation for disc 20 is provided in a novel fashion by employing differential centrifugal force which is exerted on the air within the cassette 10 by the opposed faces of disc 20. The centrifugal force results from the difference in the respective diameters of the openings at the top and bottom ends of the hub 24 and the adequate clearance provided between the outer periphery of disc 20 and the several sidewalls of cassette 10. During the initial operation of the cassette, the ventilation for disc 20 assists in cleaning of the disc. Initial cleaning is primarily performed in conventional fashion by, for example, brushes attached to the read/write heads which enter the cassette through the aperture 14 in side wall 13, when shutter 15 is open.

When the cassette 10 is removed from its receptacle in the data processing apparatus, after use has been made of the data recorded on disc 20, the elasticity of walls 11 and 12 automatically restores the cassette to the out-of-use state illustrated in FIG. 2.

The invention is not of course in any way limited to the embodiment described and illustrated, and in fact embraces all means which represent technical equivalents of those mentioned, whether considered separately or in combination and when employed within the context of the following claims.

What is claimed is:

1. A container for magnetic data recording discs comprising a flat cassette shaped for insertion into a suitable receptacle of a data processing apparatus, said cassette being provided with a sidewall having a normally closed opening for providing access to a disc inside of the cassette for recording and/or reading means of the data processing apparatus, a pair of generally parallel walls generally parallel to faces of the disc, one of said opposing walls having an opening for enabling rotary drive means of the apparatus to be coupled to an annular hub of the disc, said opposing walls being rigid and elastically deformable and outwardly convex in a free state of the walls, an internal projection extending from the center of the other of the opposing walls, said projection having an annular bearing surface facing the inside of the other wall, the one wall having an opening coaxial with the projection, said coaxial opening being bordered by an annular bearing surface on the outside face of the one wall, the disc having an annular hub carrying two axially displaced flanges, said flanges respectively extending internally and externally of the hub, said flanges being arranged to engage respective ones of said bearing surfaces, said flanges being axially spaced from each other by a smaller distance than the bearing surfaces when the opposing walls of the cassette are in the free state so that when the disc is not engaged by the drive means an elastic restoring force from the opposing walls, while in a flattened state, mechanically holds the disc in position, the data being released in operation in response to said walls being moved closer together.

2. The container of claim 1 wherein said bearing surfaces and flanges are arranged to seal off the hub of the disc and said opening in the out-of-use state to close off the cassette in a sealed fashion.

3. The container of claim 2 wherein the respective diameters of said opening in the cassette and of the internal flange on the hub of the disc are sufficiently different to enable the disc to be self-ventilating while it is being driven as a result of a differential centrifugal force exerted on air in the cassette.

4. The container of claim 3 wherein the internal and external flanges on the hub of the disc are respectively situated at opposite ends of the disc.

5. The container of claim 1 wherein the respective diameters of said opening in the cassette and of the internal flange on the hub of the disc are sufficiently different to enable the disc to be self-ventilating while it is being driven as a reslt of a differential centrifugal force exerted on air in the cassette.

6. The container of claim 2 wherein the internal and external flanges on the hub of the disc are respectively situated at opposite ends of the disc.

7. The container of claim 1 wherein the internal and external flanges on the hub of the disc are respectively situated at opposite ends of the disc.

8. A container for a magnetic recording disc for use in connection with read and/or write heads of an apparatus comprising a cassette having first and second opposed, rigid, elastically deformable walls extending generally parallel to faces of the disc, and hub means for rotatably driving the disc through the first wall from a shaft of the apparatus and for enabling the walls to be deflected inwardly toward each other and the disc by force exerting means of the apparatus while the disc is being driven by the shaft and for maintaining the opposed walls in a rigid parallel relationship while the disc is not being driven by the shaft.

9. The container of claim 8 wherein the walls are outwardly convex while in a free state, and the hub means includes means for exerting opposed forces on the opposed walls to maintain the walls in the rigid parallel relationship.

10. The container of claim 9 wherein the hub means includes oppositely directed bearing surfaces for selectively engaging projections connected to the opposed walls, said projections being engaged by the bearing surfaces while the disc is not being driven by the shaft, said projections being disengaged from the bearing surfaces by the force exerting means while the disc is being driven by the shaft.

11. The container of claim 8 wherein the hub means includes oppositely directed bearing surfaces for selectively engaging projections connected to the opposed walls, said projections being engaged by the bearing surfaces while the disc is not being driven by the shaft, said projections being disengaged from the bearing surfaces by the force exerting means while the disc is being driven by the shaft.

* * * * *